United States Patent

[15] 3,646,583

Scuderi

[45] Feb. 29, 1972

[54] AUTOMATIC ACCIDENT SIGNALLING APPARATUS FOR MOTOR VEHICLES

[72] Inventor: Santi Scuderi, Fuchsweg 3, 3097 Liebfeld (Bern), Switzerland

[22] Filed: Aug. 18, 1969

[21] Appl. No.: 850,821

[30] Foreign Application Priority Data

Aug. 27, 1968 Italy.................................39326 A/68

[52] U.S. Cl.....................................340/52 H, 200/61.45 M
[51] Int. Cl......................B60q 9/00, B60q 5/00, B60q 1/00
[58] Field of Search..................340/52 H, 61; 200/61.45 M, 200/61.45

[56] References Cited

UNITED STATES PATENTS

| | | | |
|---|---|---|---|
| 1,901,554 | 3/1933 | De Wilde | 340/61 |
| 2,791,653 | 5/1957 | Haberland | 200/61.45 |
| 2,898,415 | 8/1959 | Clurman | 200/61.45 |
| 3,123,801 | 3/1964 | Bosler | 340/52 H |
| 3,213,226 | 10/1965 | Konderla | 200/61.45 |
| 3,295,101 | 12/1966 | Ellis | 200/61.45 |

*Primary Examiner*—John W. Caldwell
*Assistant Examiner*—Glen R. Swann, III
*Attorney*—Guido Modiano and Albert Josif

[57] ABSTRACT

An automatic accident-signalling apparatus for motor vehicles, arranged inside the motor vehicle, comprising at least one device sensitive to collision and means-emitting signals controlled by said device sensitive to collision.

1 Claims, 4 Drawing Figures

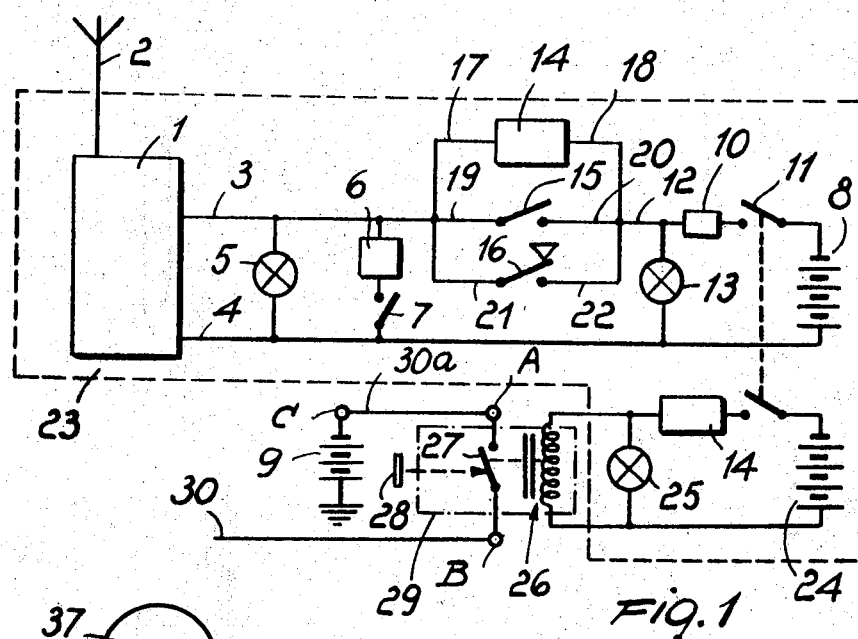
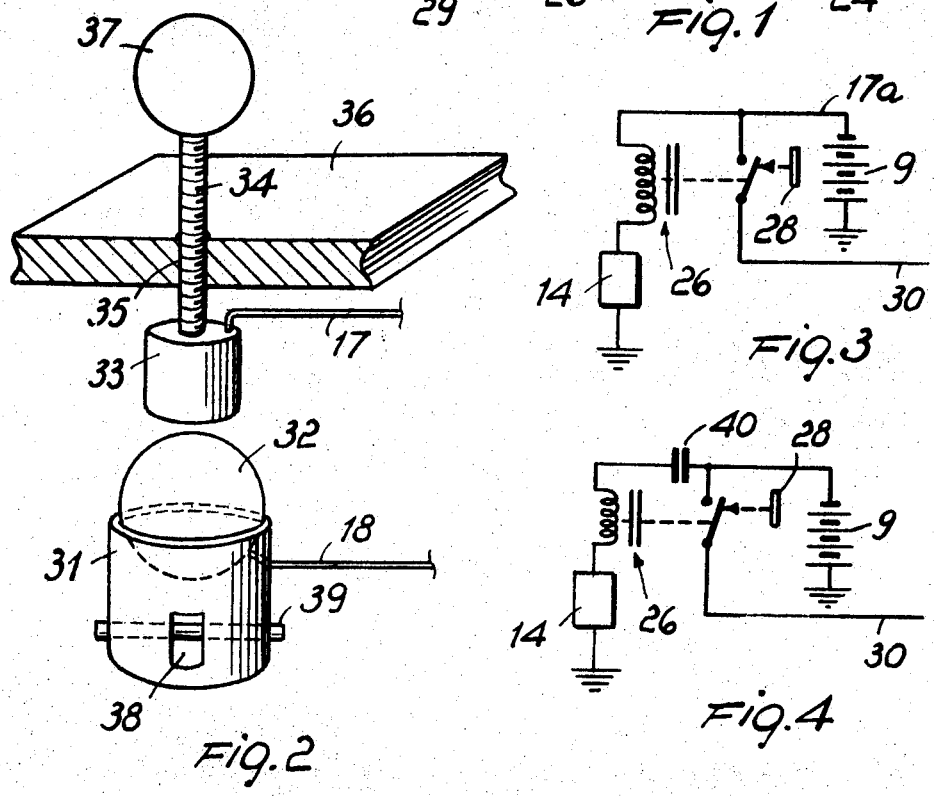
SANTI SCUDERI INVENTOR.
BY Albert Jorif
Agent

3,646,583

AUTOMATIC ACCIDENT SIGNALLING APPARATUS FOR MOTOR VEHICLES

BACKGROUND OF THE INVENTION

This invention relates to an automatic accident-signalling apparatus for motor vehicles, intended to self-operate in case of collision or overturning of the vehicle and to furnish danger signals to arriving motor vehicles.

SUMMARY OF THE INVENTION

According to the invention, the apparatus comprises essentially a device sensitive to collision, the sensitivity of which is adjustable manually, and which operates a lower power radio transmitter of consequently small radius of action. This this radio transmitter transmits an alarm signal intended to be received by radio receiver, installed in nearby arriving vehicles, said radio receivers being maintained always in operation when the motor vehicles are travelling.

According to modified embodiment there is provided another device also sensitive to collision, similar to the preceding device but calibrated at lesser sensitivity, which causes isolation of the vehicle or storage battery in case of more violent collision or overturning.

BRIEF DESCRIPTION OF THE DRAWING

The apparatus according to the invention will now be described by way of example with reference to the accompanying drawing in which:

FIG. 1 is the electrical schematic diagram of said apparatus;

FIG. 2 is a diagrammatic perspective view of the device sensitive to collision as used in the apparatus;

FIG. 3 is a variation of part of the schematic diagram of FIG. 1, in an embodiment independent of the rest of the apparatus;

FIG. 4 is a further variation analogous with that of FIG. 3.

DESCRIPTION OF PREFERRED EMBODIMENTS

In FIG. 1, a radio transmitter 1 provided with an antenna 2 installed in a suitable place in the vehicle is operated by a current sent through the conductors or lines 3 and 4, a signal lamp 5 being inserted between said wires 3 and 4 for signalling transmitter operation.

An acoustic alarm device 6 is also connected between the wires 3 and 4 by way of a switch 7, and when the manual switch 7 is closed it furnishes an acoustic signal indicating operation of the radio transmitter.

A battery 8 permits operation of the apparatus independent of the normal vehicle battery or storage battery 9. The battery 8 is connected to a fuse 10 and a general manual switch 11. As visible from FIG. 1 the general switch 11 is a double-throw knife switch. A signal lamp 13 is connected between the wires 4 and 12 after the general switch.

In order to operate the radio transmitter 1, it is necessary to connect together the wires 3 and 12, which can be done in three different ways: firstly the connection between the wires 3 and 12 may be made automatically by the impact switch device 14 sensitive to collision shown in FIG. 2, following a collision; secondly said connection may be established by means of a manual switch 15; thirdly said connection may be established by operating a key 16 such that connection remains throughout the whole of the time during which the key 16 is pushed. It is evident that the impact switch device 14 sensitive to collision, the manual switch 15 and the key 16 are connected together in parallel by means of the wires 17, 18, 19, 20 and 21, 22 respectively.

Enclosed in the same casing 23 together with the preceding complex there is a similar complex which interrupts the flow of current from the vehicle battery 9. This latter complex comprises a battery 24, a second impact switch device 14 sensitive to collision of the type shown in FIG. 2, a signal lamp 25 and a relay 26 of the type which when energized opens its contact 27 and maintains it open until an appropriate pushbutton 28 is operated, which permits said contact to close. While all the other components of the latter complex are enclosed within the same casing 23 as the preceding complex, the relay 26 is enclosed in a very solid casing 29, capable of resisting collisions. The pushbutton 28 and two terminals A and B project from said casing 29. Having previously disconnected the corresponding electric cable 30 from the terminal C of the motor vehicle battery 9, a first terminal of the casing, e.g., A, is connected to the terminal C by means of a thickness of cable 30a, and the other terminal B is connected to the cable 30 of the motor vehicle.

Means of anchorage are also provided on the casing 29 of the relay 26 for securing the casing to a suitable point of the motor vehicle.

FIG. 2 shows diagrammatically the said impact switch device 14 sensitive to collision. The device 14 comprises a base section 31 with a generally cylindrical base, on which lies a ferromagnetic sphere 32 in the rest position, insulated electrically from the section 31. As clearly visible from FIG. 2, the cylindrical base 31 has a seat at the upper end thereof, the seat defining a receiving space for the sphere 32 and having a circular periphery with a diameter less than the maximum diameter of the sphere, thereby allowing a portion of said sphere to penetrate into said receiving space. Above the sphere 32 is a magnet 33. The magnet 33 may be rotatably supported by a threaded shaft 34 from which it is insulated electrically, said shaft being screwed into a threaded hole 35 in the cover 36 of the casing 23, with which the base 31 is rigid. By acting on the knob 37 and rotating the threaded shaft 34 in its seat 35, the magnet 33 can be raised and lowered. It is thus possible to adjust the distance between the magnet 33 and the sphere 32.

In the case of vehicle collision, the device 14 closes the corresponding circuit by operating in the following manner: at the moment of collision the sphere 32 is thrust by its force of inertia and it rises, trying to escape from the base 31. But as it rises it approaches the magnet 33 which after a certain point attracts it. There is then physical contact between the sphere 32 and the magnet 33, and hence each time there is a collision or jolt of a certain strength, electrical contact is made between the wires 17 and 18, which are connected to the magnet 33 and the sphere 32 respectively as well as to the respective input and output terminals of the impact switch 14.

It should be noted that the sensitivity to collision of the device 14 can be adjusted in a very simple and efficient manner by merely acting on the knob 37. In fact the closer the magnet is to the sphere, the more sensitive is the device 14, because the movement of the sphere 32 needs to be less and hence the force of inertia which it must possess in case of collision in order to operate the system is less. It is obvious that once such a device is closed, it remains closed until the sphere 32 and magnet 33 are separated. Separation and disjunction of the sphere from the magnet is carried out by known means. As an example in FIG. 2 a hole 38 has been provided for this purpose on the base section 31 and a pivot 39 which extends transversally to the cylinder at the hole 38. A suitable cord, which may consist of said electric wire 18, can be fixed to the sphere 32, made to pass around the pivot 39 and to leave from the hole 38. By pulling said cord, the sphere 32 is compelled to lower itself and to free itself from the magnet 33, so breaking the electric contact.

The operation of the device 14 inserted between the battery 24 and relay 26 is naturally identical to that of the analogous device 14 inserted between the wires 17 and 18, the device 14 connected between the wires 17 and 18 serving to put the radio transmitter into operation, and the second device 14 connected between the battery 24 and the relay 26 serving to disconnect the battery 9 from the motor vehicle.

Flow of current from the battery 9 can be restored only by pushing the manual pushbutton 28 after having naturally disconnected the sphere 32 from the magnet 33 of the device 14.

The fact that the relay 26 remains in tension until the device 14 is acted on has no adverse effect on the relay, which is sized so as to be able to be energized for very long periods. If on the other hand the current should stop after a certain period, the relay contacts would remain always open, as they can close only by pushing the restoring pushbutton.

In FIGS. 3 and 4 two further applications of the device 14 sensitive to collision are shown in combination with the relay 26. In FIG. 3 the relay 26 is connected to the terminals of the vehicle battery 9 by way of the device 14. As in FIG. 1, the contacts of the relay are connected on one side to that terminal of the battery 9 which is not connected to earth and on the other side to the wire 30 which from said battery carries the current to the electrical installation of the vehicle. In the case of violent collision or overturning, depending upon the sensitivity of the device 14, the relay 26 is energized and the relative contact interrupts the flow of current from the battery 9 to the wire 30. Also in this case the relay 26 remains energized or in tension until the circuit is broken by separating the sphere from the magnet 33.

If, however, it is preferred not to leave the relay 26 in tension, the circuit shown in FIG. 4 can be used. Said circuit differs from that of FIG. 3 by the addition of a condenser 40 connected in series with the relay 26 and the device 14, the assembly being connected to the terminals of the battery 9.

The operation of the circuit shown in FIG. 4 is as follows: in the case of collision the device 14 closes the circuit and connects one side of the condenser 40 to earth by way of the relay 26.

By this means the condenser becomes charged and the charging current is such as to trip the relay 26. After a short time the condenser 40 is charged and current no longer circulates through the relay 26. The relay 26 is thus deenergized but its contact still remains open until the pushbutton 28 is pushed.

From that which has been said heretofore, the usefulness of this connection is clear, in that it serves to prevent chains of accidents in case of fog, low visibility or the like, and it can permit elimination of horns, it being sufficient to operate the key 16 in order to warn vehicles in the vicinity. Further, this invention can be modified in the sense that certain categories of vehicles, such as police cars, ambulances, fire engines and the like can use a different recognition signal and hence request a free passage by using the apparatus of this invention in place of the siren.

Further, in case of damage to the vehicle in a dangerous place, by night or in fog, the present apparatus can be operated by manually closing the switch 15. In this way, the operation of said apparatus will signal the presence of the obstacle formed by the damaged vehicle.

It is likewise evident to the experts of this field that car radios contained in motor vehicles could be easily modified to incorporate the apparatus according to this invention, and which would render the use of such a necessary apparatus very economical.

The invention so conceived is susceptible to numerous variations, all of which enter into the protective field of the appended claims. Thus for example the base 31 is of any shape, capable of containing another body also of any shape, having the same function as the sphere 32. Further, the magnet 33 may be of any shape. The circuits of FIGS. 3 and 4 may also undergo indeterminant modifications, in the form of abolition or connection of signal lamps, switches and the like.

What is claimed is:

1. An automatic accident-signalling apparatus for motor vehicles with a storage battery and a main energy supply cable from said storage battery to the electric appliances of the motor vehicle, the apparatus being arranged inside the motor vehicle and comprising: a casing, within the casing:
   a radio transmitter for emitting accident signals,
   a first battery independent of said storage battery,
   at least one line connecting said first battery to said transmitter, interposed in said at least one line and connected in parallel to each other: an impact switch and at least one manually operated switch;
   and after said switches an acoustic alarm device and a signal lamp, both connected in parallel in said line,:
   a general double-throw knife switch having one knife thereof interposed in said line between said first battery and said switches, a fuse in series with said knife and after said fuse a second signal lamp connected in parallel in said line,
   the apparatus further comprising within said casing a second battery,
   outside said casing: a relay switch interposed in said main energy supply cable,
   at least another line connecting electrically said relay switch with said second battery;
interposed in said another line and within said casing: a second impact switch, the other of the knives of said double throw knife switch being interposed between said second impact switch and said second battery,
   and after said impact switch a further signal lamp connected in parallel in said another line;
thereby to supply electric energy to said transmitter and cause it to emit accident signals and to energize said relay switch and maintain it open, when the motor vehicle is subjected to an impact capable of actuating said impact switches,
   said impact switches having each an input and an output terminal, a ferromagnetic sphere, a wire connecting electrically said sphere to one of said terminals thereof, a cylindrical base electrically insulated from said sphere, said cylindrical base having an upper end and a seat in said upper end defining a receiving space for said sphere, said seat having a circular periphery, said sphere resting against said circular periphery when in normal resting position, said circular periphery having a diameter less than the maximum diameter of said sphere thereby allowing a portion of said sphere to penetrate into said receiving space defined by said seat, a magnet member above said cylindrical base at a distance from said circular periphery thereof, conduit means electrically connecting said magnet member to another of said terminals, adjustable screw means connected with said magnet member, said adjustable screw means having an end thereof projecting outside said casing thereby to allow adjustment of said magnetic member from the outside of said casing, said second impact switch having its adjustable screw means adjusted to a less impact sensitivity than that of said first impact switch.

* * * * *